(12) United States Patent
Goto et al.

(10) Patent No.: US 7,066,131 B2
(45) Date of Patent: Jun. 27, 2006

(54) CYLINDER HEAD

(75) Inventors: Satoru Goto, Tokyo (JP); Sadao Nakayama, Tokyo (JP); Yoshiharu Ono, Kanagawa-ken (JP)

(73) Assignee: Niigata Power Systems Co., Ltd. (JP)

( * ) Notice: Subject to any disclaimer, the term of this patent is extended or adjusted under 35 U.S.C. 154(b) by 82 days.

(21) Appl. No.: 10/474,609

(22) PCT Filed: Feb. 13, 2002

(86) PCT No.: PCT/JP02/01198

§ 371 (c)(1),
(2), (4) Date: Oct. 9, 2003

(87) PCT Pub. No.: WO03/069147

PCT Pub. Date: Aug. 21, 2003

(65) Prior Publication Data

US 2004/0084005 A1    May 6, 2004

(51) Int. Cl.
*F02N 3/00* (2006.01)

(52) U.S. Cl. .................................................. 123/188.8
(58) Field of Classification Search ............. 123/188.8
See application file for complete search history.

(56) References Cited

U.S. PATENT DOCUMENTS

| 3,640,261 | A | * | 2/1972 | Josey | 123/188.8 |
| 3,868,953 | A | * | 3/1975 | Roll | 123/188.8 |
| 4,011,852 | A | * | 3/1977 | Rasch | 123/188.8 |
| 4,217,875 | A | * | 8/1980 | Elsbett et al. | 123/188.8 |
| 4,438,740 | A | * | 3/1984 | Slee | 123/188.8 |
| 5,551,393 | A | | 9/1996 | Amano et al. | 123/306 |
| 5,601,061 | A | * | 2/1997 | Dam et al. | 123/298 |

* cited by examiner

*Primary Examiner*—John T. Kwon
(74) *Attorney, Agent, or Firm*—Ostrolenk, Faber, Gerb & Soffen, LLP (57) ABSTRACT

In the present invention, there is provided a cylinder head in which seat rings, against which are placed intake valves, are mounted respectively on a plurality of intake ports that communicate with a combustion chamber of an internal combustion engine, and, among the plurality of intake ports, an intake port on which is mounted an eccentric seat ring, with a center of an inner diameter of this eccentric seat ring being eccentric relative to a center of an outer diameter of this eccentric seat ring, is present together with an intake port on which is mounted a standard seat ring, with a center of an inner diameter of this standard seat ring matching a center of an outer diameter of this standard seat ring. As a result, a flow coefficient can be secured using the intake port on which the standard seat ring is mounted, and the swirl flow can be strengthened using the intake port on which the eccentric seat ring is mounted. Consequently, it is possible to obtain the two conflicting elements of a secure flow coefficient and a strengthened swirl flow.

2 Claims, 9 Drawing Sheets

COMBINATION NO. 13

A: ECCENTRIC SEAT RING (FACING APERTURE B)
B: STANDARD SEAT RING

FIG. 7B

COMBINATION NO. 14

A: ECCENTRIC SEAT RING (45° ECCENTRIC RELATIVE TO CYLINDER LINER)
B: STANDARD SEAT RING

FIG. 7C

COMBINATION NO. 15

A: ECCENTRIC SEAT RING (FACING CYLINDER LINER)
B: STANDARD SEAT RING

CYLINDER HEAD

BACKGROUND OF THE INVENTION

1. Field of the Invention

The present invention relates to a cylinder head that enables for a high engine thermal efficiency to be maintained while keeping NOx levels low with improving the combustion performance of a lean burn gas engine.

2. Description of the Related Art

In an internal combustion engine such as a gas engine or the like, a seat ring is mounted on an aperture of an intake port that communicates with a combustion chamber, and there is provided a seat surface that is in contact with an intake valve that opens and closes this aperture.

Figure 11:
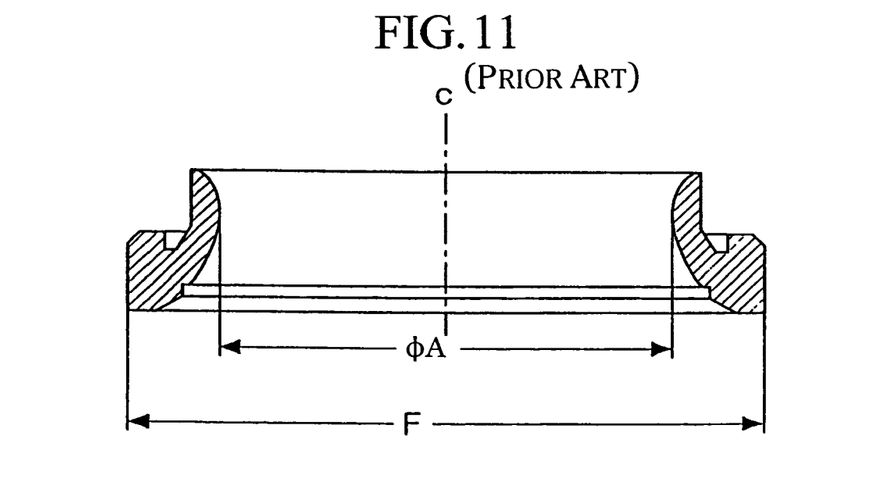
FIG. 11 is a cross-sectional view of a standard seat ring used in a conventional cylinder head.

An example of the configuration of a conventional seat ring is shown in FIG. 11. This seat ring (referred to below as a standard seat ring) has an annular configuration, the inner diameter $\phi A$ of which is concentric with the outer diameter F. Namely, the inner diameter $\phi A$ and the outer diameter F have the same center a.

In a gas engine the combustion of a fuel-air mixture of fuel gas and air is carried out by flame propagation. Accordingly, the active use of an air flow provides an improvement in thermal efficiency by shortening the combustion period.

However, because the inner diameter $\phi A$ is concentric with the outer diameter F in a standard seat ring, in a gas engine fitted with a standard seat ring the swirl ratio is small and it is difficult to improve the performance of a combustion that makes use of air flow.

Furthermore, the latest diesel engines are designed such that a relatively high output can be obtained in proportion to the size of the engine. Namely, it is required that the engine is a high brake mean effective pressure (BMEP) engine. Consequently, in order to secure the necessary quantity of air for combustion to proceed, there is a tendency to employ a high pressure ratio type of supercharger, and to design the intake and exhaust ports of the cylinder head with a large cross-sectional area and with a configuration that has few bends and the like. In ports with this type of configuration the flow coefficient is high but a strong swirl flow is not generated.

In contrast, a pilot oil ignition gas engine has been developed that aims to provide cleaner exhaust through perfect combustion, a high output, and a high thermal efficiency. This pilot oil ignition gas engine aims to keep production costs in check by using the same principal components as those used in a diesel engine.

Because a cylinder head of this pilot oil ignition gas engine is the same as that used in a diesel engine, it has a high flow coefficient, however, the swirl ratio is zero and no improvement in the combustion performance by making use of air flow can be expected.

Accordingly, in the development of this pilot oil ignition gas engine, the suppression of the flow coefficient to a minimum at the same time as the swirl ratio is improved is desired in order to improve thermal efficiency.

The present invention was conceived in view of the above circumstances and it is an object thereof to provide a cylinder head that enables the conflicting elements of the flow coefficient being maintained as well as the swirl ratio being strengthened to both be achieved, and to thereby obtain an improvement in thermal efficiency.

SUMMARY OF THE INVENTION

Next, a detailed description will be given of an apparatus to solve the above described problems with reference made to drawings relating to the embodiments.

Namely, the present invention is a cylinder head in which seat rings, against which are placed intake valves, are mounted respectively on a plurality of intake ports that communicate with a combustion chamber of an internal combustion engine, wherein, among the plurality of intake ports, an intake port on which is mounted an eccentric seat ring, with a center of an inner diameter of this eccentric seat ring being eccentric relative to a center of an outer diameter of this eccentric seat ring, is present together with an intake port on which is mounted a standard seat ring, with a center of an inner diameter of this standard seat ring matching a center of an outer diameter of this standard seat ring.

In this cylinder head, as a result of an intake port on which is mounted an eccentric seat ring being present together with an intake port on which is mounted a standard seat ring, the flow coefficient is secured by the intake port on which is mounted the standard seat ring, while the swirl flow is strengthened by the intake port on which is mounted the eccentric seat ring. Therefore, it is possible to obtain the two conflicting elements of a secure flow coefficient and a strengthened swirl flow and then a higher thermal efficiency is obtained compared with when only the standard seat rings are mounted or with when only the eccentric seat ring is mounted.

In this case, it is desirable that two of the intake ports are aligned in a direction from an intake manifold side towards an opposite side sandwiching the cylinder head, and the standard seat ring is mounted on one of the intake ports while the eccentric seat ring is mounted on the other intake port. As a specific example, it is possible to employ a structure in which the camshaft goes from the intake manifold side towards the other side across the cylinder head, and two intake ports are positioned between the camshaft side and the intake manifold side of the cylinder head, and in which the standard seat ring is mounted on one of the intake ports while the eccentric seat ring is mounted on the other intake port.

In this cylinder head, in a structure in which two intake ports are provided, namely, in a structure provided with the minimum number of intake ports are needed to implement the present invention, the standard seat rings are mounted on one of the intake ports while the eccentric seat rings are mounted on the other intake port. As a result, it is possible to obtain the two conflicting elements of a secure flow coefficient and a strengthened swirl flow even when two intake ports are provided, and a higher thermal efficiency is obtained compared with when only the standard seat ring is mounted on these two intake ports or with when only the eccentric seat ring is mounted thereon.

It is also desirable that the eccentric seat ring be mounted at a relatively distant position as seen from the intake manifold side.

By doing this it becomes possible to generate an effective swirl flow using the wall surface of the cylinder liner at a relatively distant position as seen from the intake manifold side.

In this case, it is still more desirable that two exhaust ports are provided in the cylinder head in parallel with the two intake ports, and a narrow portion of an edge of the eccentric seat ring faces the exhaust port side at an angle of approximately 45° relative to a direction heading from the manifold side towards the camshaft side.

In this cylinder head, by mounting the eccentric seat ring on the intake port at a relatively distant position as seen from the intake manifold side, and by facing a narrow portion of the edge of the eccentric seat ring towards the exhaust side at an angle of approximately 45° relative to a direction heading from the manifold side towards the camshaft side, it is possible to effectively use the wall surface of the cylinder liner, and to generate an effective swirl flow in the combustion chamber.

Moreover, because the direction of the intake entry is along the wall surface of the cylinder liner and is also a direction that results in little interference with the intake from the intake port where the standard seat ring is mounted, the swirl flow can be strengthened and the flow coefficient can be secured.

DESCRIPTION OF THE PREFERRED EMBODIMENTS

Preferred embodiments of the cylinder head according to the present invention will now be described with reference to the drawings.

The present invention selects an appropriate eccentric direction and mounting position for a seat ring of an intake port that is mounted on a cylinder head of a gas engine, strengthens the swirl flow without reducing the flow coefficient, and improves the combustion performance by accelerating air flow during combustion. The present invention can be appropriately used in engines in which the combustion of a fuel-air mixture is performed by flame propagation, namely, pilot oil ignition engines, spark ignition gas engines, spark ignition gasoline engines, and the like. Engines that employ the technology of the present invention may also be used, for example, in stationary types of power generation installations for industrial or public use.

Figure 1:
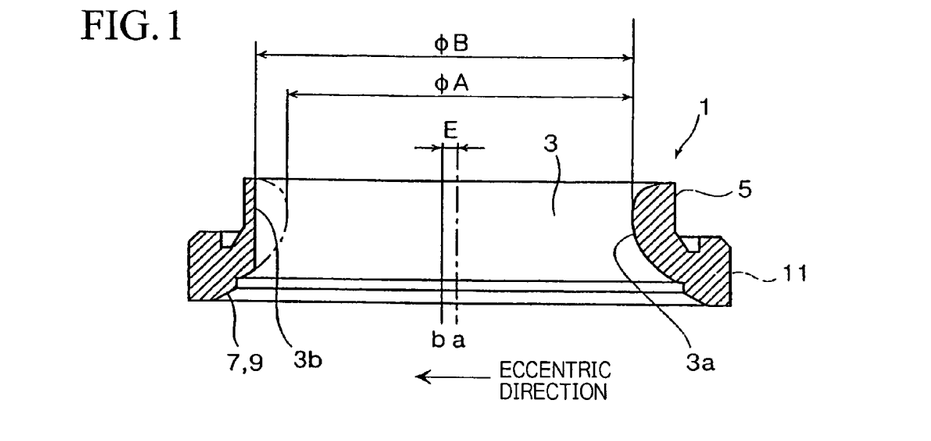
FIG. 1 is a cross-sectional view of an eccentric seat ring used in the cylinder head according to the present invention.
Figure 2:
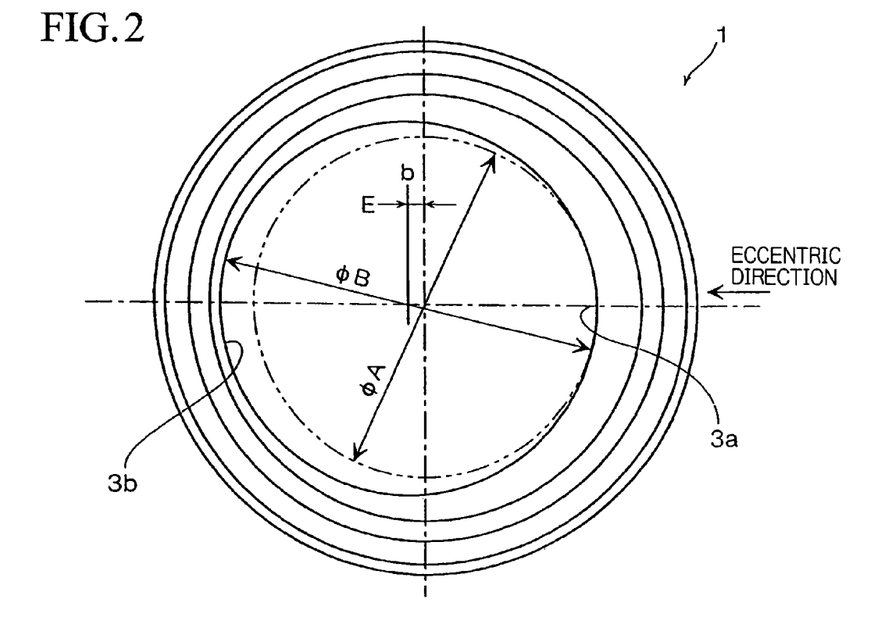
FIG. 2 is a plan view of the eccentric seat ring shown in FIG. 1.

FIG. 1 is a cross-sectional view of a seat ring (referred to below as an eccentric seat ring) used in the cylinder head according to the present invention. FIG. 2 is a plan view of the eccentric seat ring shown in FIG. 1.

The eccentric seat ring 1 shown in FIG. 1 is mounted on an aperture of an intake port that opens into a cylinder head. The eccentric seat ring 1 is formed by an entry aperture portion 5 having a hole portion 3 that opens onto the side of the intake port, a valve seat portion 9 having a seat surface 7 that is provided on the side of a combustion chamber and that is in contact with an intake valve, a fitting portion 11 used when the eccentric seat ring 1 is mounted on the aperture of the cylinder head, and the like.

In the eccentric seat ring 1, the center of the outer diameter thereof does not match the center of the inner diameter of the hole portion 3. Namely, in the eccentric seat ring 1, the center of the inner diameter of the hole portion 3 deviates from the center of the outer diameter. Specifically, the circumferential surface of an inner diameter φB having a center b that deviates by a distance E from the center a of the outer diameter forms an inner circumferential surface of the hole portion 3. Here, a direction from the center a of the outer diameter towards the center b of the inner diameter is called the eccentric direction of the eccentric seat ring 1.

In order to obtain this type of eccentric hole portion 3, after forming the circumferential surface of the inner diameter φA having a center a that is identical to that of the outer diameter, the circumferential surface of the inner diameter φB is formed by cutting the first formed circumferential surface. As a result, as is shown in FIG. 1, portions of the inner circumferential surface of the hole portion 3 that are on the opposite side from the eccentric direction of the eccentric seat ring 1 are in contact with a convex circumferential surface 3a resulting when the circumferential surface of the inner diameter φA is formed, however, the remaining portions form a flat circumferential surface 3b that gradually widens upwards and downwards as it heads in the eccentric direction of the eccentric seat ring 1. The vertical width of the flat circumferential surface 3b is greatest on the eccentric direction side of the eccentric seat ring 1 (i.e., on the left side in FIG. 1).

In contrast, in addition to the eccentric seat ring 1, the standard seat ring shown in FIG. 11 is mounted on the aperture of the intake port with the center a of the outer diameter thereof matching the inner diameter φA of the hole portion 3. In this standard seat ring the outer diameter thereof is concentric with the hole portion 3.

Namely, in the cylinder head according to the present embodiment, an intake port fitted with the eccentric seat ring 1 is present together with an intake port fitted with a standard seat ring.

In the present embodiment, by optimally selecting the mounting position and eccentric direction of the eccentric seat ring 1 and the standard seat ring, it is possible to obtain the conflicting elements of both a secure flow coefficient and a strengthened swirl flow. An example of this is described below with reference to FIGS. 3 through 7.

FIGS. 3A to 7C are typical plan views showing cylinder heads. These cylinder heads have two apertures each, the apertures A and B and the apertures C and D for each single cylinder. In addition, in these drawings, the left side is the camshaft side and the right side is the manifold side (both the intake manifold and the exhaust manifold are on the same side).

Figure 3A:
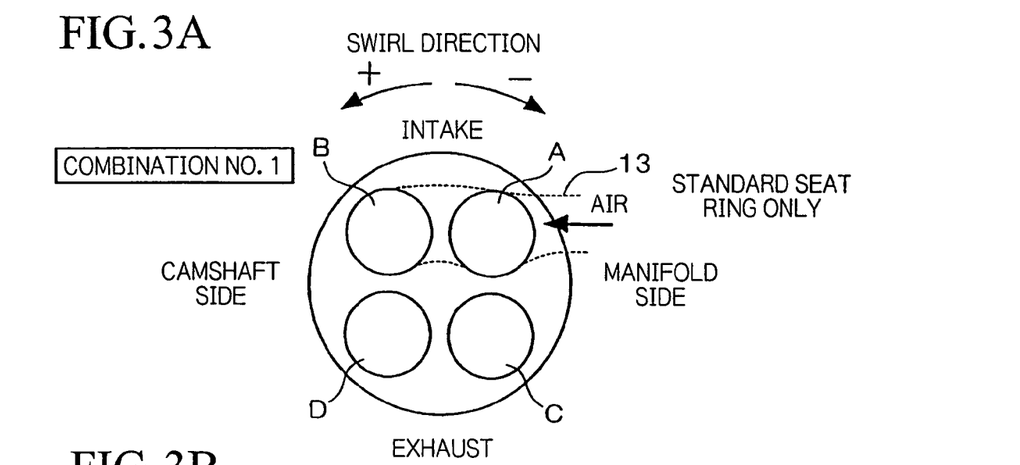
FIG. 3A is a plan view showing a variation (No. 1) of a combination of seat rings mounted on a cylinder head.
Figure 3B:
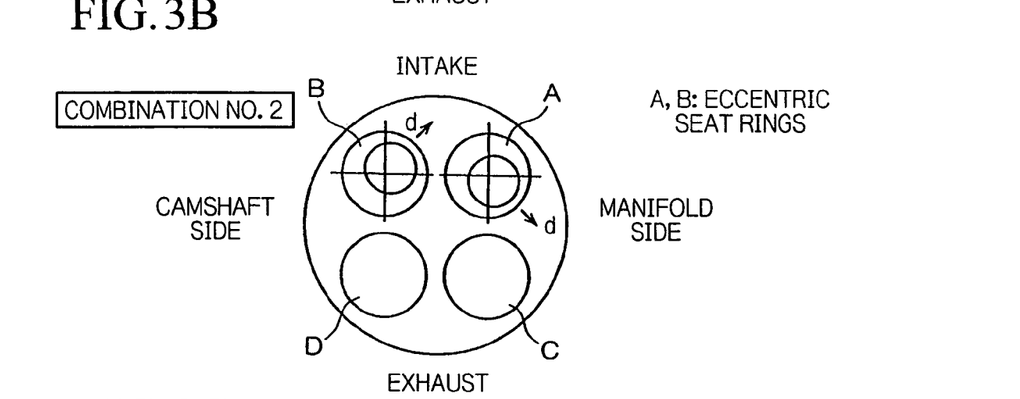
FIG. 3B is a plan view showing a variation (No. 2) of a combination of seat rings mounted on a cylinder head.
Figure 3C:
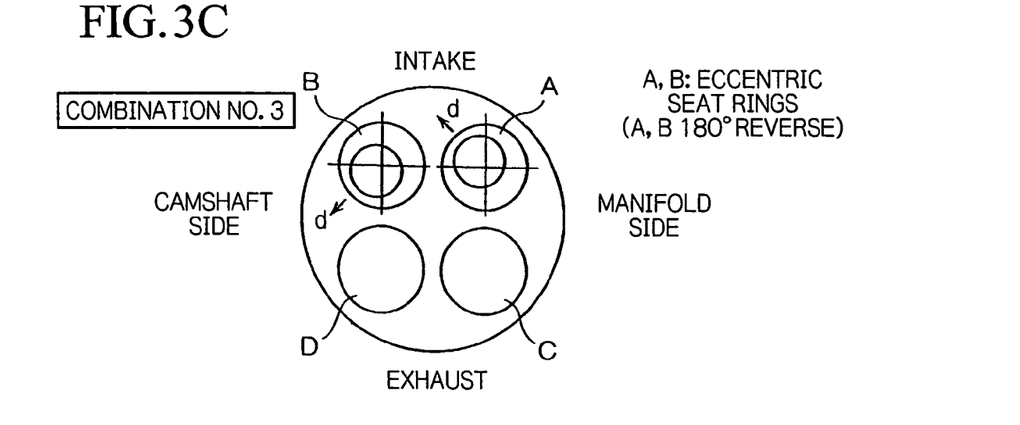
FIG. 3C is a plan view showing a variation (No. 3) of a combination of seat rings mounted on a cylinder head.
Figure 4A:
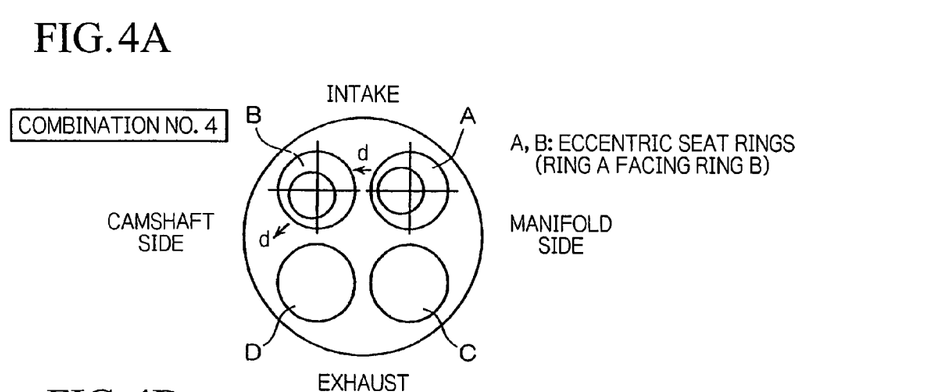
FIG. 4A is a plan view showing a variation (No. 4) of a combination of seat rings mounted on a cylinder head.
Figure 4B:
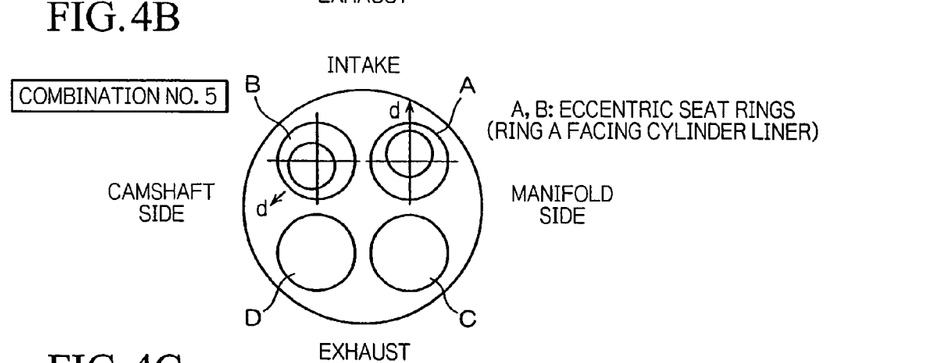
FIG. 4B is a plan view showing a variation (No. 5) of a combination of seat rings mounted on a cylinder head.
Figure 4C:
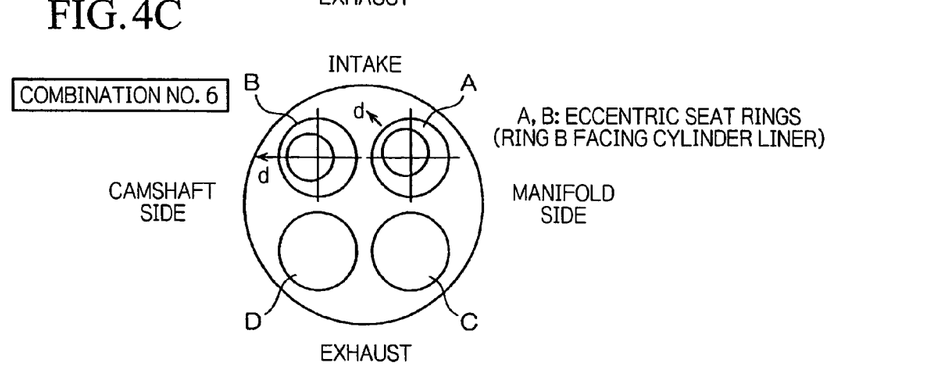
FIG. 4C is a plan view showing a variation (No. 6) of a combination of seat rings mounted on a cylinder head.
Figure 5A:
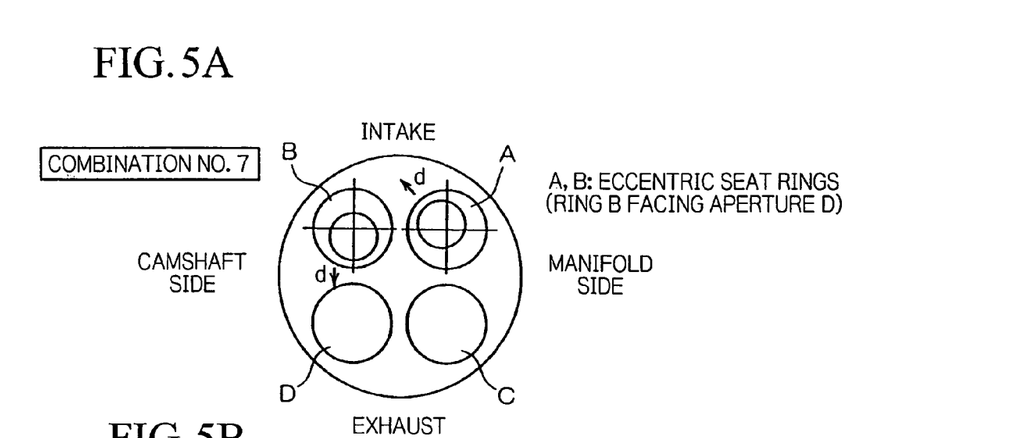
FIG. 5A is a plan view showing a variation (No. 7) of a combination of seat rings mounted on a cylinder head.
Figure 5B:
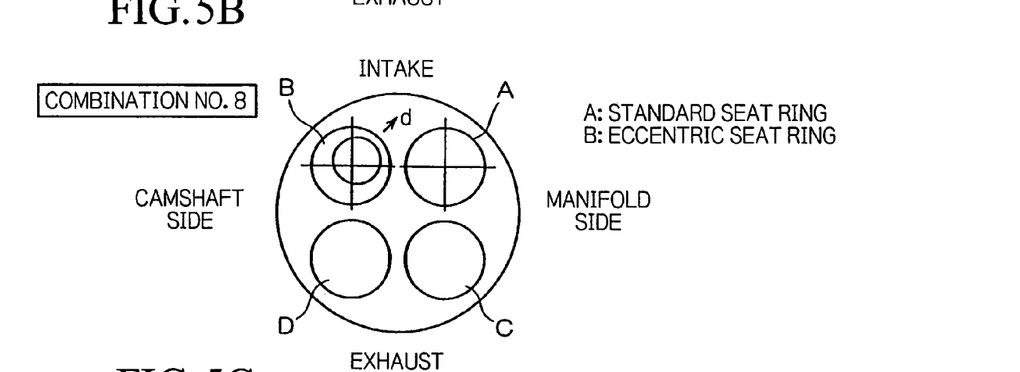
FIG. 5B is a plan view showing a variation (No. 8) of a combination of seat rings mounted on a cylinder head.
Figure 5C:
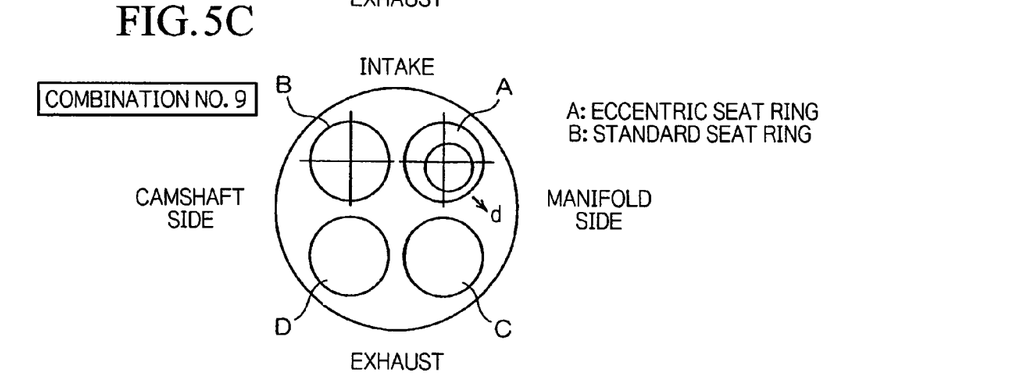
FIG. 5C is a plan view showing a variation (No. 9) of a combination of seat rings mounted on a cylinder head.

In this cylinder head, one end of the two intake ports 13 and 14 shown by the broken line in FIG. 3A communicates with a combustion chamber via the apertures A and B. These apertures A and B are both opened and closed by intake valves (not shown). Although omitted from the drawings, the other end of the intake ports 13 and 14 are connected to each other so as to be in an upstream/downstream relationship relative to the intake flow.

Furthermore, the apertures A and B are positioned such that a line segment passing through the centers of both apertures A and B extends from the manifold side towards the opposite side (the camshaft side in the examples in the drawings) with the cylinder head in between.

The apertures C and D of the exhaust ports (not shown) that communicate with the combustion chamber are placed parallel with the respective apertures A and B of the intake ports 13 and 14. The apertures C and D are both opened and closed by exhaust valves (not shown).

Next, the results obtained when the flow coefficients and swirl flow strengths were compared in the cylinder heads shown in FIGS. 3A to 7C using a steady flow test apparatus employing an impeller will be explained with reference to FIGS. 3A to 8.

The total of 15 diagrams shown in FIGS. 3A to 7C show combinations of eccentric directions of eccentric seat rings and positions of standard seat rings and eccentric seat rings mounted on the respective apertures A to D in the steady flow test apparatus. Note that, in FIGS. 3A to 7C, the centers of the outer diameter of the eccentric seat rings match the centers of the apertures on which those eccentric seat rings are mounted. Moreover, in FIGS. 3A to 7C, the arrow d indicates the eccentric direction of the eccentric seat rings.

For the flow coefficient and swirl flow, a flow coefficient of 0.51 and a dimensionless swirl number of 0.134, which are approximately the same as those of a conventional gas engine, were targeted.

These target values were employed for the following reasons. Namely, in a conventional gas engine, because the output per unit of cylinder volume is low (a small output of less than 1.23 MPa (when expressed using BMEP), and less than 1.47 MPa even at its largest), a large quantity of air for combustion is not required. When designing an intake port for the cylinder head in this type of conventional gas engine, the conflicting elements of flow coefficient and swirl flow can be set at appropriate values without any special technologies needing to be used. However, for the purposes of pursuing economic efficiency by reducing initial costs and achieving a reduction in running costs by increasing the power generating efficiency of the engine and the like, if the output per unit of cylinder volume is increased to a high output of 1.47 MPa (using BMEP) or more, or desirably of 1.72 MPa or more, or still more desirably of 1.96 MPa or more, then because a greater quantity of air is required than is the case conventionally, designing the intake ports with priority given to the flow coefficient is unavoidable.

In contrast, it is necessary to make the swirl flow an appropriate value such that flame propagation of the fuel-air mixture that uses an ignition source inside a cylinder of the gas engine as a start point is accelerated and reliable burning of the fuel-air mixture is ensured. However, normally, when the output per unit of cylinder volume is increased, if the flow coefficient is secured in the same manner as for a conventional gas engine, it is not possible for the swirl flow to have the same strength that it has in a conventional gas engine.

Accordingly, in the present embodiment, a flow coefficient of 0.51 and a dimensionless swirl number of 0.134, which are approximately the same as in a conventional gas engine, were targeted in order to maintain these conflicting elements of flow coefficient and swirl flow even in a high output engine. In other words, the present embodiment obtains a higher output per cylinder than is obtained conventionally, achieves a reduction in initial costs and a reduction in running costs through improved engine power generating efficiency, and improves the economic efficiency of the engine by maintaining approximately the same flow coefficient and dimensionless swirl number as those obtained in a conventional gas engine by using a combination of a standard seat ring and an eccentric seat ring. Furthermore, even if the present embodiment is used in an engine with a BMEP of less than 1.23 MPa, an improvement in the thermal efficiency to match the strengthened swirl flow is possible.

Figure 8:
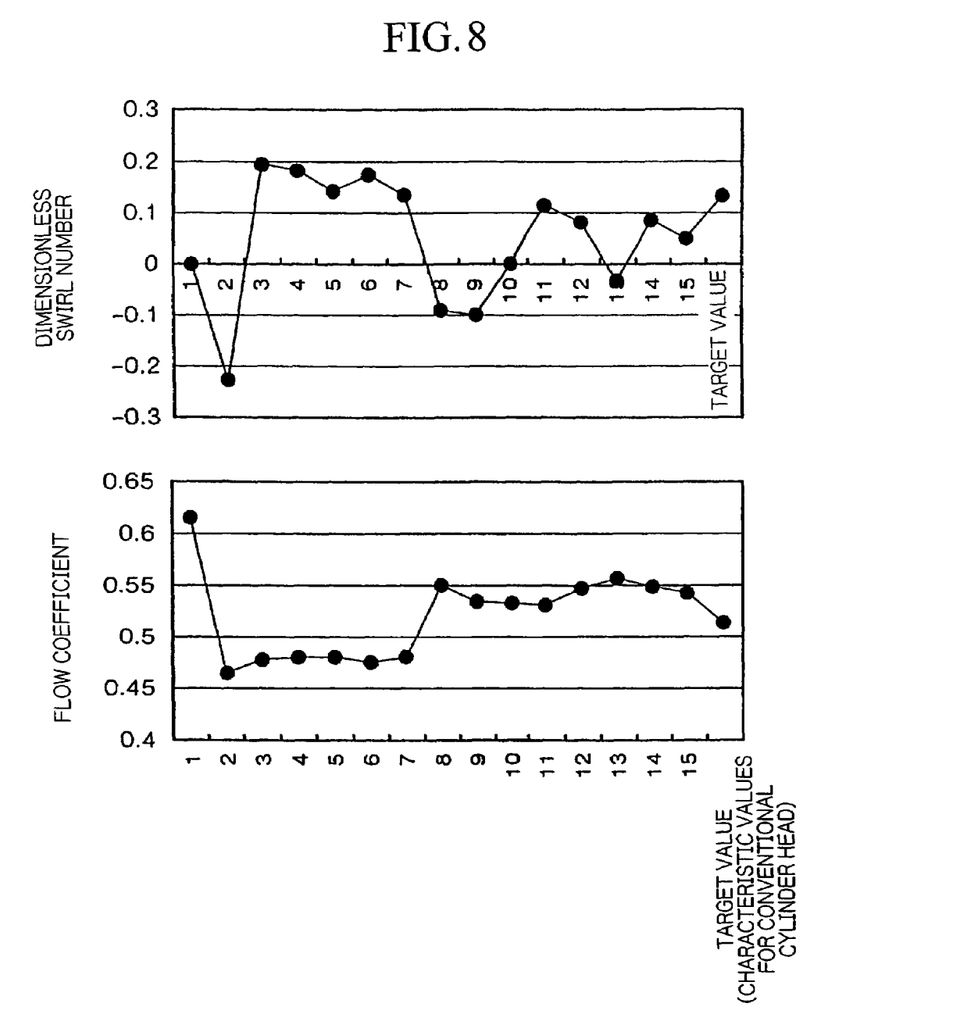
FIG. 8 is a graph showing a flow coefficient and a dimensionless swirl number in the variations of combinations of seat rings shown in FIGS. 3A to 7C.

FIG. 8 shows the flow coefficient and dimensionless swirl number when the valve lift is at maximum in the various combinations of seat rings shown in FIGS. 3A to 7C. Note that the + or − of the dimensionless swirl number on the vertical axis in FIG. 8 indicates the direction of the swirl flow and, as is shown in FIG. 3A, as seen from the explosion surface of the cylinder head, the anticlockwise direction is +, while the clockwise direction is −.

As is shown in FIG. 3A (seat ring combination No. 1), if standard seat rings are mounted on both apertures A and B, then as is shown in FIG. 8, the flow coefficient is a high 0.6 or more, but the dimensionless swirl number is 0.

In contrast, as is shown in FIGS. 3B, 3C, 4A, 4B, 4C, and 5A, if eccentric seat rings are mounted on both apertures A and B (seat ring combination Nos. 2 to 7), then as is shown in FIG. 8, it is possible to increase the dimensionless swirl number to between 0.15 to 0.2, however, the flow coefficient is reduced to approximately 0.45 to 0.48.

Furthermore, as is shown in FIGS. 5B, 5C, 6A, 6B, 6C, 7A, 7B and 7C, a standard seat ring was mounted on one of the apertures A or B, and an eccentric seat ring was mounted on the other aperture A or B (combination Nos. 8 to 15), and the relationships between the direction of the eccentric seat ring and the air flow properties were evaluated.

Figure 6A:
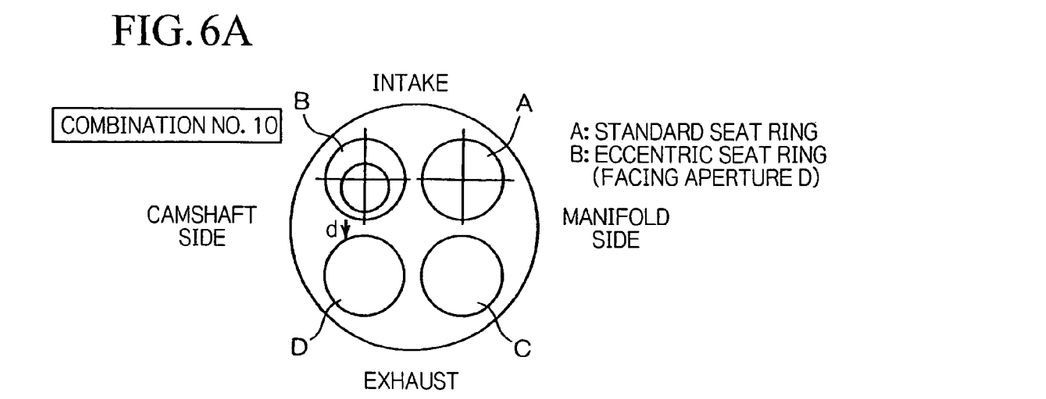
FIG. 6A is a plan view showing a variation (No. 10) of a combination of seat rings mounted on a cylinder head.
Figure 6B:
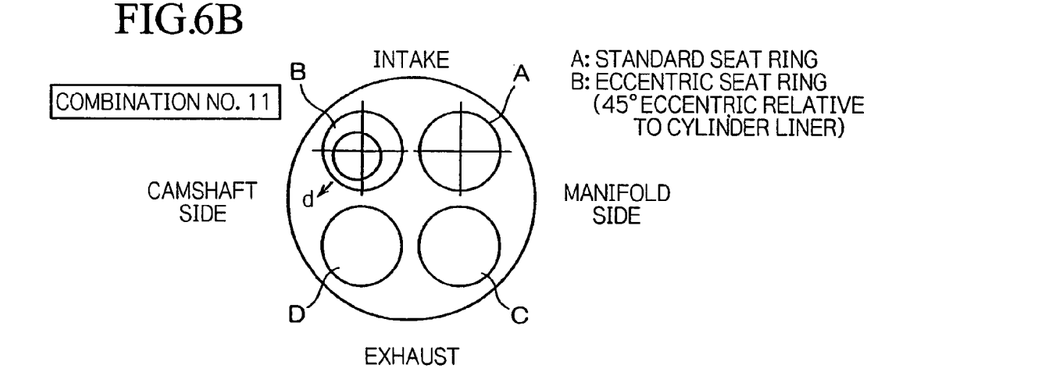
FIG. 6B is a plan view showing a variation (No. 11) of a combination of seat rings mounted on a cylinder head.
Figure 6C:
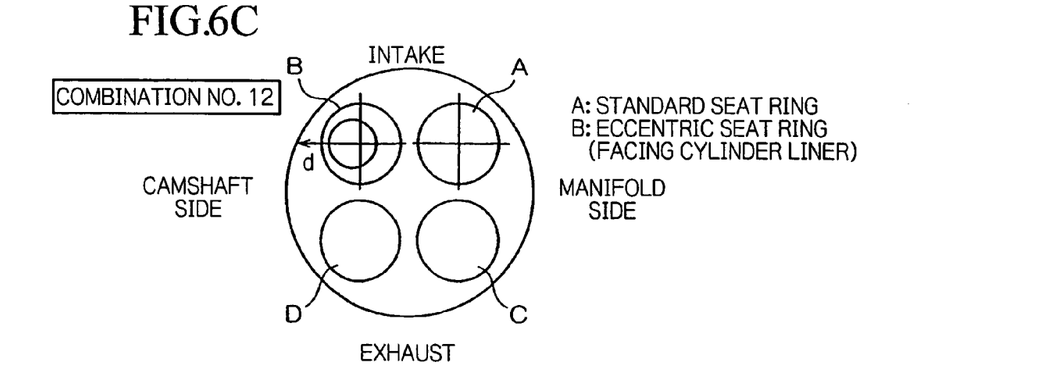
FIG. 6C is a plan view showing a variation (No. 12) of a combination of seat rings mounted on a cylinder head.
Figure 7A:
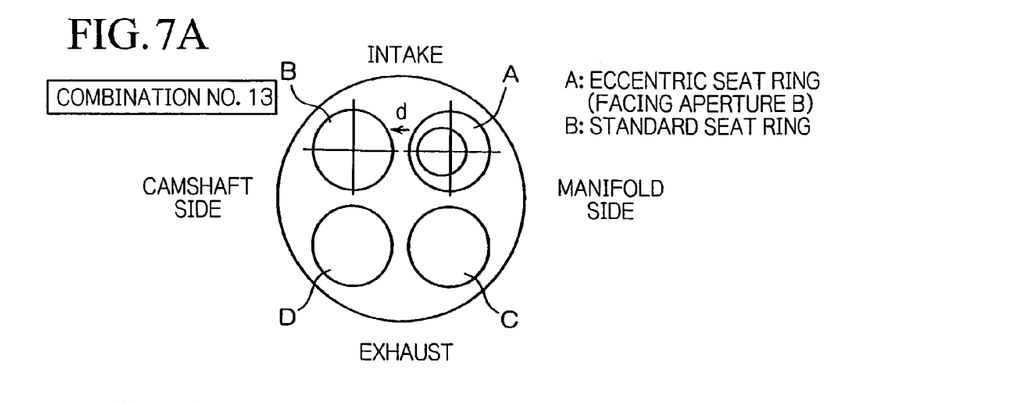
FIG. 7A is a plan view showing a variation (No. 13) of a combination of seat rings mounted on a cylinder head.
Figure 7B:
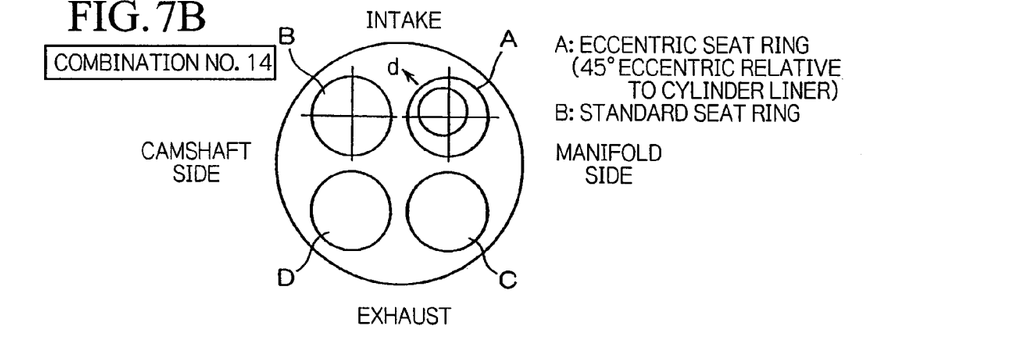
FIG. 7B is a plan view showing a variation (No. 14) of a combination of seat rings mounted on a cylinder head.
Figure 7C:
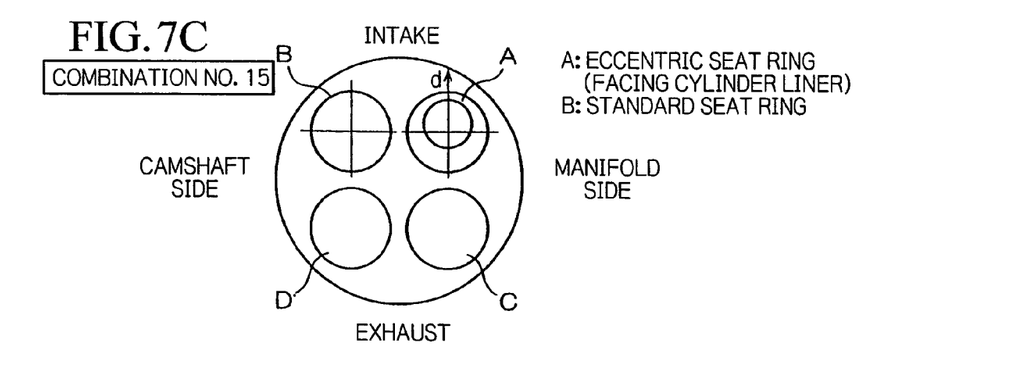
FIG. 7C is a plan view showing a variation (No. 15) of a combination of seat rings mounted on a cylinder head.

As a result, as is shown in FIG. 6B, when an eccentric seat ring was mounted on aperture B and the direction thereof was set at 45° inward from the liner wall surface (combination No. 11), then the target characteristics were evident.

Because aperture B is in a relatively distant position as seen from the intake manifold side, then it can be considered that an effect of a swirl flow being generated is obtained by using the cylinder liner wall surfaces. Moreover, in this case as well, a flow coefficient of approximately 0.54 to 0.55 was secured by mounting a standard seat ring on the aperture A.

Namely, the flow coefficient is secured by the intake port on which the standard seat ring is mounted, while the swirl flow is strengthened by the intake port on which the eccentric seat ring 1 is mounted by employing an intake port on which is mounted the eccentric seat ring 1 that has the eccentric hole portion 3 together with an intake port on which is mounted a standard seat ring that has a non-eccentric hole portion 3.

Consequently, it is possible to obtain the two conflicting elements of a secure flow coefficient and a strengthened swirl flow. As a result, a higher thermal efficiency is obtained compared with when only standard seat rings are mounted or with when only the eccentric seat rings 1 are mounted.

EXAMPLE

Next, a description will be given of the result obtained when an engine having a seat ring structure corresponding to combination No. 11 (FIG. 6B) was prepared and a test was performed on the operation performance thereof.

Figure 9:
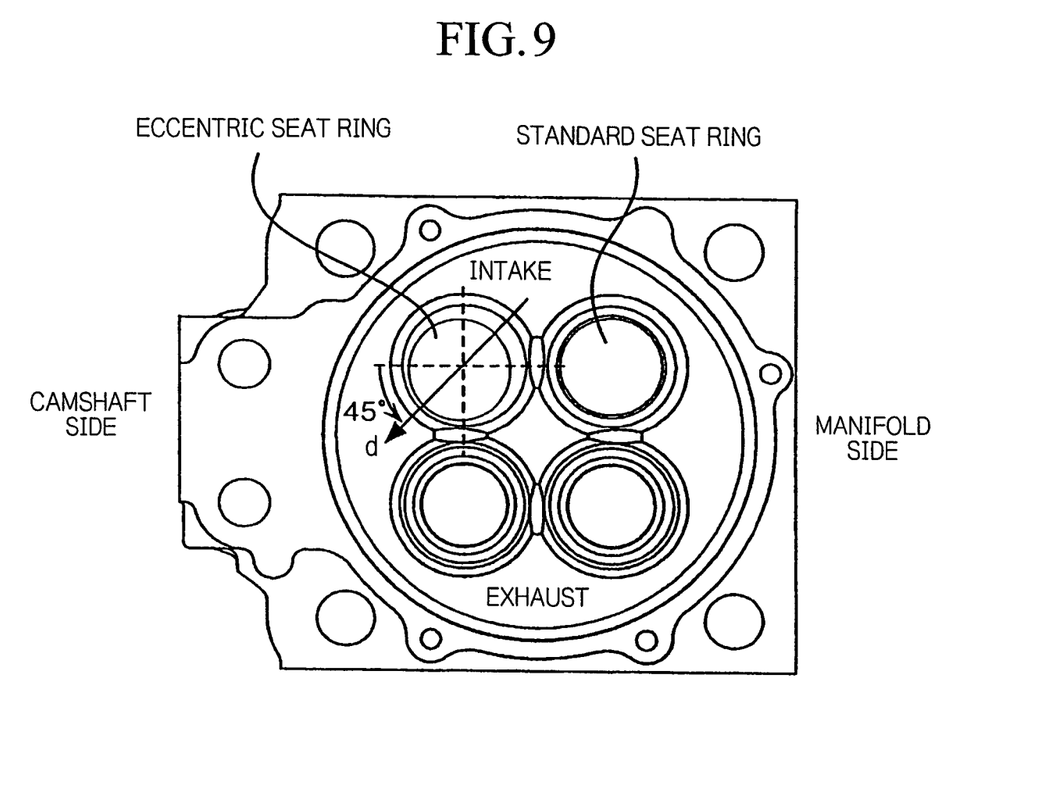
FIG. 9 is a plan view of a cylinder head having a seat ring structure corresponding to combination No. 11 shown in FIG. 6B.
Figure 10:
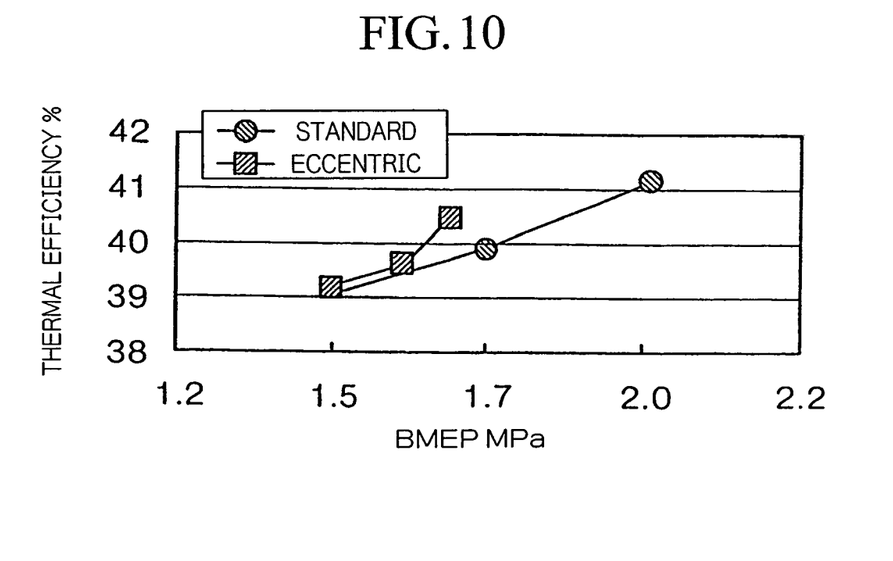
FIG. 10 is a graph showing a comparison of the thermal efficiency of an engine having the cylinder head shown in FIG. 9 and an engine fitted solely with a conventional seat ring.

FIG. 9 is a plan view showing a cylinder head of an engine having a seat ring structure corresponding to combination No. 11. FIG. 10 is a graph showing a comparison of the thermal efficiency of the engine shown in FIG. 9 with that of an engine on which standard seat rings are mounted.

The engine of this example was one in which seat rings having the seat ring structure of combination No. 11 (FIG. 6B) were fitted on a cylinder head of a 6 cylinder engine whose cylinders had a diameter of 220 mm. Namely, an eccentric seat ring was provided on the intake port in a relatively distant position as seen from the intake manifold side. In addition, as is shown by the arrow d in FIG. 9, the narrow portion of the edge of the eccentric seat ring was positioned on the exhaust port side at an angle of approximately 45° from the camshaft side.

As a result, it was clear that, as is shown in FIG. 10, in the seat ring structure of the present embodiment in which the eccentric seat ring is mounted, the thermal efficiency was 0.2 to 0.5 points higher than the case in which only standard seat rings were mounted.

As can be understood from the result of this example, the combination of the seat rings is optimized by mounting an eccentric seat ring on the intake port in a relatively distant position as seen from the intake manifold side, and by positioning the narrow portion of the edge of the eccentric seat ring on the exhaust port side at an angle of approximately 45° from the camshaft side. In this case, the wall surface of the cylinder liner can be effectively used, and a swirl flow can be can be generated effectively in the combustion chamber. Moreover, because the direction of the intake entry is along the wall surface of the cylinder liner and is also a direction that results in little interference with the intake from the intake port where the standard seat ring is mounted, the swirl flow can be strengthened and the flow coefficient can be secured.

Note that, in the above described embodiment, the method to form an eccentric seat ring is not limited to that a description, given in FIG. 1, of when an eccentric seat ring 1 having a non-symmetrical configuration between left and right is formed by first forming a convex circumferential surface 3a with an inner diameter φA whose center is identical to the center a of the outer diameter, and by then cutting the circumferential surface of the inner diameter φB in an eccentric position. For example, it is also possible to form the entire inner circumference as a convex circumferential surface and to form the entire inner circumference as a flat circumferential surface or the like, and to form an eccentric seat ring in which the thickness thereof varies but the left-right configuration is substantially similar.

Furthermore, in the above described embodiment, a case is shown in which the eccentric seat ring 1 has a larger inner diameter φB than the inner diameter φA of the standard seat ring. However, in order to strengthen the swirl flow it is not essential that the inner diameter of the eccentric seat ring is larger than the inner diameter of the standard seat ring. It is also possible to make the inner diameter of the eccentric seat ring 1 smaller than the inner diameter of the standard seat ring in an intake port of a cylinder head with a large flow coefficient. However, in the actual design thereof, because the flow coefficient and swirl flow are mutually conflicting characteristics, it is desirable that the inner diameter of the eccentric seat ring is larger than the inner diameter of the standard seat ring.

Moreover, it is also possible to employ a structure in which each intake port independently communicates with the intake manifold. Although, in the above described embodiment, as is shown by the broken line in FIG. 3A, an example is shown in which two intake ports 13 and 14 each open onto a combustion chamber, and the other end portions of the two intake ports 13 and 14 are connected to each other so as to be in an upstream/downstream relationship relative to the flow of the intake.

Furthermore, it is also possible to employ a structure in which the camshaft side is positioned such that the intake manifold is on the opposite side and the intake manifold faces the exhaust manifold across the cylinder. Although, in the above described embodiment, in FIGS. 3A to 7C examples are shown in which the left side is the camshaft side and the right side is the manifold side (both the intake manifold and the exhaust manifold are on the same side).

The invention claimed is:

1. A cylinder head in which seat rings, against which are placed intake valves, are mounted respectively on a plurality of intake ports that communicate with a combustion chamber of an internal combustion engine, wherein, an intake manifold and a camshaft are positioned at opposite sides sandwiching the cylinder head, two intake ports are aligned in a direction from an intake manifold side towards a camshaft side of the cylinder head, and an eccentric seat ring, with a center of an inner diameter of this eccentric seat ring being eccentric relative to a center of an outer diameter of the eccentric seat ring, is mounted on one of the intake ports which positions at the camshaft side while a standard seat ring, with a center of an inner diameter of this standard seat ring matching a center of an outer diameter of this standard seat ring is mounted on the other side of the intake ports which positions at the intake manifold side.

2. A cylinder head according to claim 1, wherein two exhaust ports are provided in the cylinder head in parallel with the two intake ports, and a narrow portion of an edge of the eccentric seat ring faces an exhaust port side at an angle of approximately 45° relative to a direction heading from a manifold side towards a camshaft side.

* * * * *